Patented Nov. 10, 1936

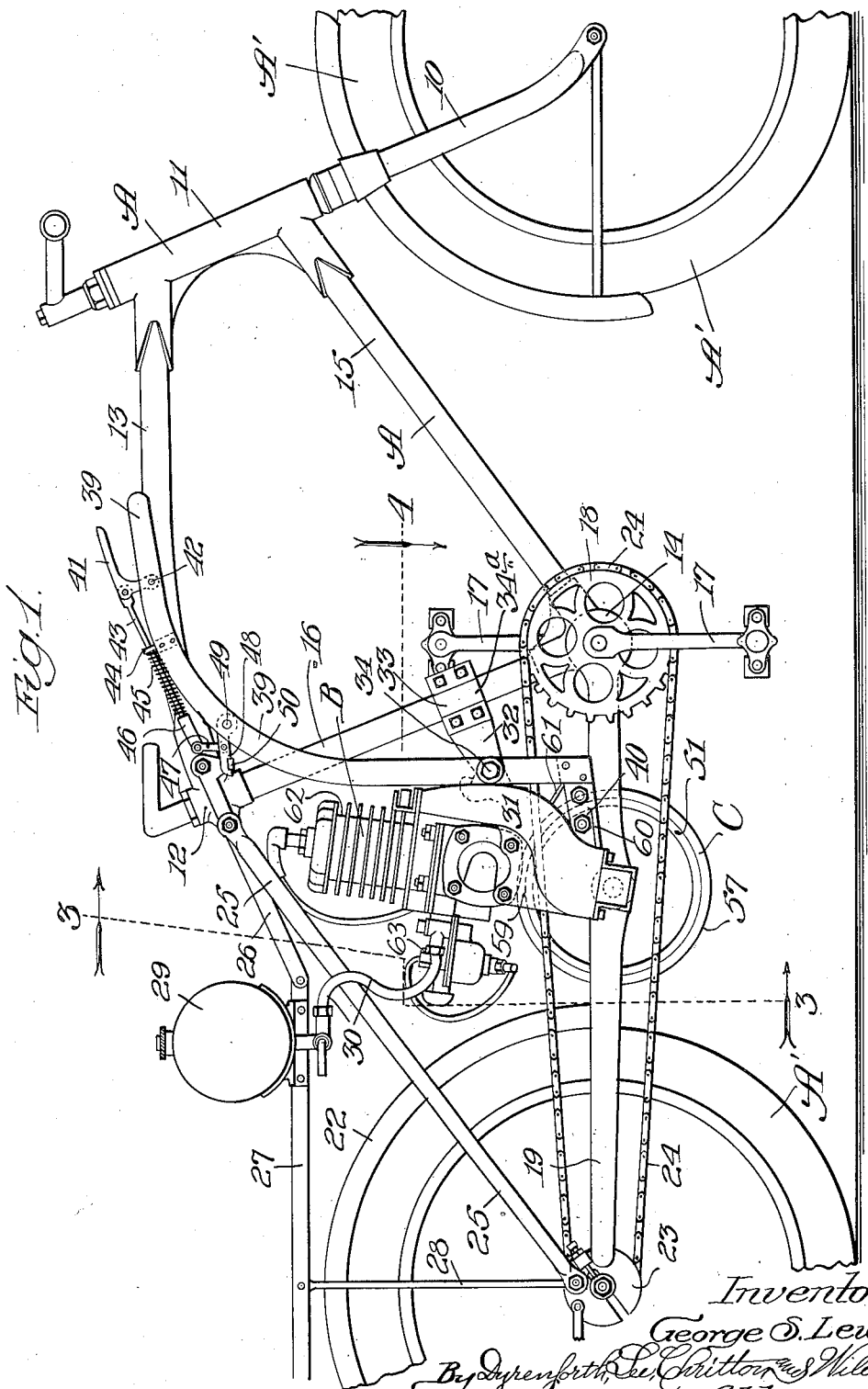

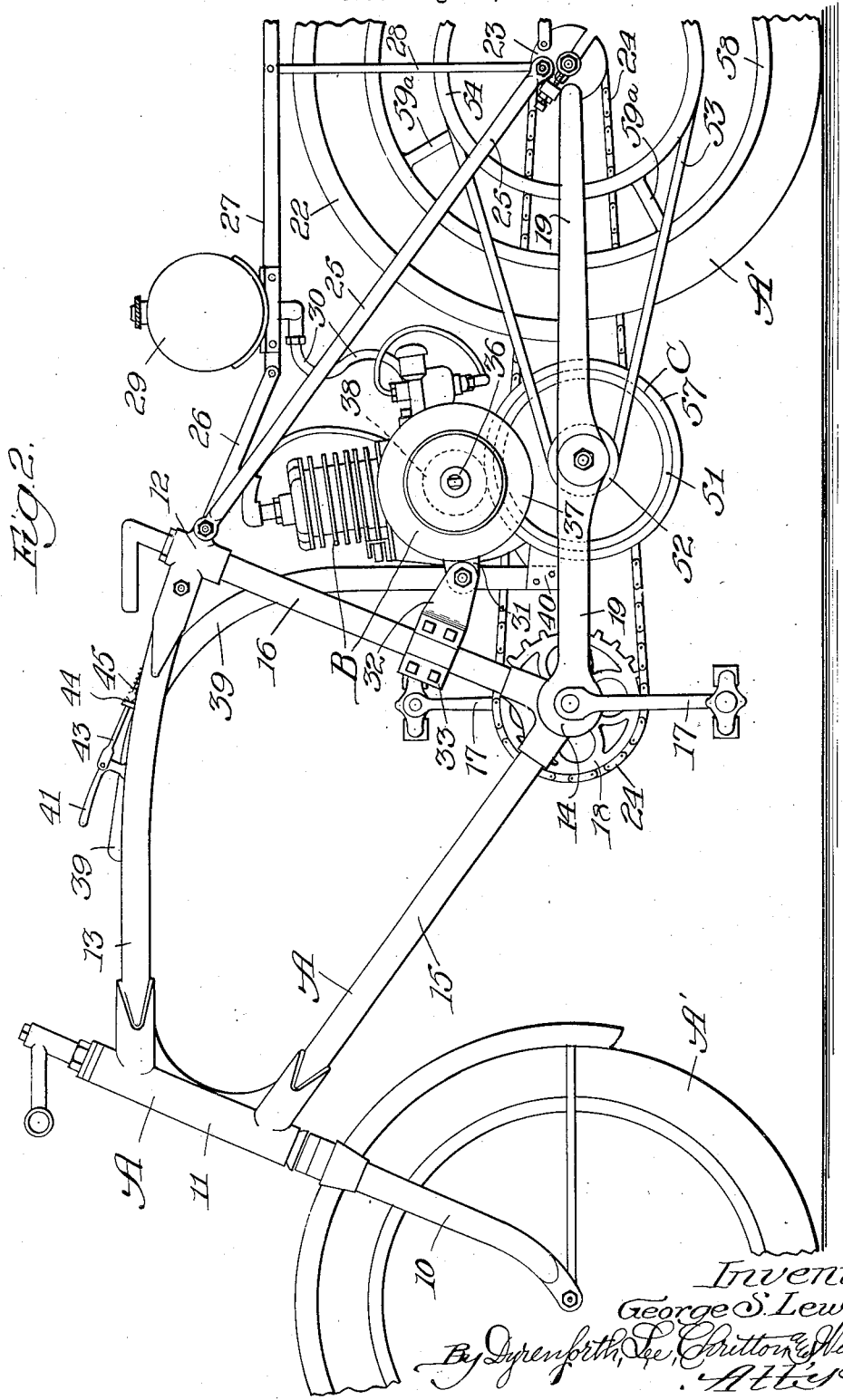

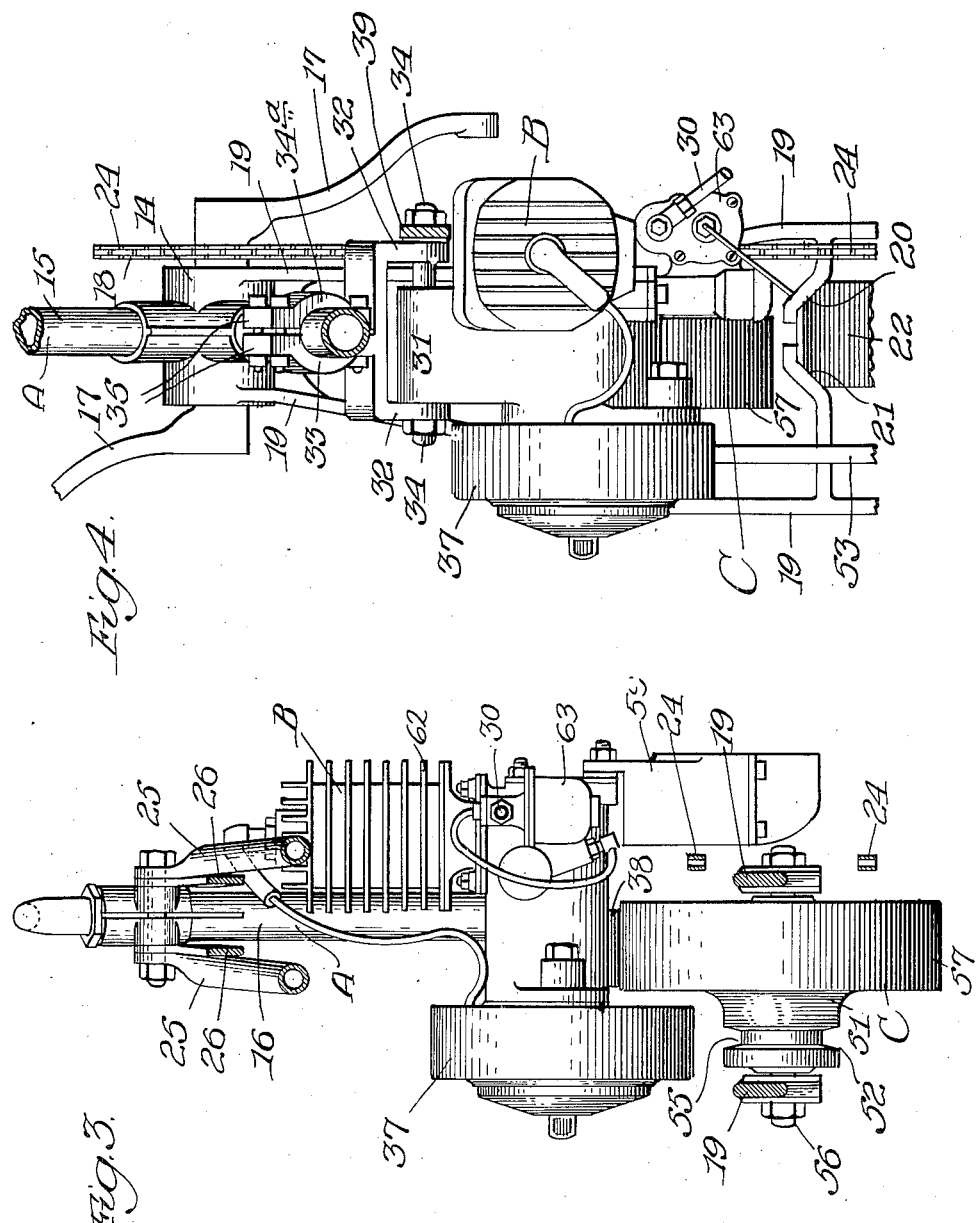

2,060,583

UNITED STATES PATENT OFFICE 2,060,583

MOTOR BICYCLE

George S. Lewis, Evanston, Ill., assignor to Battery Patents Corporation, Chicago, Ill., a corporation of Illinois Application August 15, 1934, Serial No. 739,979

9 Claims. (Cl. 180—33)

This invention relates to a motor bicycle or motorcycle and is particularly useful in connection with a light type of motor equipped bicycle.

An object of the invention is to provide a motor equipped bicycle of light but sturdy construction which may be operated at very low cost and high efficiency. A further object is to provide drive-clutch mechanism by which the bicycle may be operated with a minimum of effort. A further object is to provide a motor and drive mechanism which may be supported within the frame in such a manner as to give increased efficiency and better distribution of weight. Other objects and specific advantages will appear as the specification proceeds.

The invention is illustrated, in a preferred embodiment, by the accompanying drawings, in which—

Figure 1 is a broken view in side elevation of a motor bicycle embodying my invention; Fig. 2, a view similar to Fig. 1 but showing the other side of the bicycle; Fig. 3, a vertical sectional view, the section being taken as indicated at line 3 of Fig. 1; and Fig. 4, a plan sectional view, the section being taken as indicated at line 4 of Fig. 1.

In the illustration given, A designates a frame equipped with wheels A'; B, a motor pivotally secured to the frame; and C, drive connections between the motor and the rear wheel.

The frame A may be of any suitable construction. In the illustration given, the steering fork 10 has a shank extending through the tubular head casting 11. A cluster casting 12 is connected to the head casting 11 by a cross tube 13. A hanger casting 14 is connected to head casting 11 by a tube 15. A vertical tube 16 connects the cluster casting 12 and the hanger casting 14. The usual crank 17 is suspended within the bearing of the hanger casting 14 and the usual sprocket wheel 18 is secured to the crank.

I have found that the castings may be made of aluminum alloys, such as, for example, duraluminum alloys and, in the assembly of such castings with tubes, the methods set out in my co-pending application Serial No. 737,996, for Bicycle frame, filed August 1, 1934, now Patent No. 1,998,994, dated April 23, 1935, may be employed, if desired.

The hanger casting 14 is provided with integrally spaced beams 19 extending rearwardly from the casting, as shown more clearly in Figs. 1, 2 and 4. As shown more clearly in Fig. 4, the beams 19, as they approach the rear wheel are spread widely apart and a cross-strut 20 separates the beam at a point near the rear wheel. The strut is turned forwardly at 21 to provide a space for the fender 22 extending about the rear wheel A'. Secured to the rear ends of the beams 19 are bearing heads 23 in which are mounted the usual bearings for the rear wheel. In view of the well known construction of the drive for the rear wheel by means of the sprocket chain 24, a detailed description will not be given, and it is sufficient to say that this type of mechanism is that commonly employed on bicycles and motorcycles.

Connecting the cluster casting 12 and the heads 23 are two brace rods 25. Also secured to the casting 12 and extending between the rods 25 are support arms 26 for the platform 27. The platform 27 is also supported by vertical rods 28 secured to the heads 23. If desired, a gasoline reservoir 29 may be supported upon the platform with a flexible conduit 30 leading therefrom to the motor B.

The motor B may be of any suitable type or construction. The motor itself has no part in the present invention and because of its well known construction need not be described herein in detail. It is sufficient to say that the motor has a cylinder 62 and a carbureter 63 and its casing 59 is equipped with a forwardly extending neck 31 extending between the forked arms 32 of a clamp support 33 and perforated to receive the pivot bolt 34 which extends through the arms 32. The clamp 33 is provided with a tubular portion 34ᵃ which extends about the tube 16 of frame A, and the split flanges 35 of the clamp are drawn together by bolts to fix the clamp upon tube 16. The front portion of casing 59 is also extended to connect with the bar 40 which is connected to the clutch lever 39. This extension of casing 59 is shown in Fig. 1 with flanges 60 and 61 to give it increased strength.

The motor B drives through its crank the usual crank-shaft 36 upon the end of which is secured a weighted wheel 37. Also secured to the shaft 36 and on the inner side of the momentum wheel 37 is a drive wheel 38. The drive wheel 38 may be formed of fiber or any other suitable material.

In order to tilt the motor B upon the pivot 34, I provide a curved clutch lever 39 which is also pivotally mounted on bolt 34 but outside of the spaced arms 32, as shown more clearly in Fig. 4. The clutch lever 39 is provided at its lower end with a rearwardly extending bar 40 which connects the lever to the casing of engine B.

If desired, suitable locking means may be employed for holding the clutch lever in the rear position of its movement. Such locking means has the additional advantage of maintaining the drive-wheel of the motor in contact with the drive connections for the rear wheel. In the illustration given, a crank arm 41 is pivotally secured at its lower end to lever 39 by pivot 42. Pivotally secured to the corner of the crank is a rod 43 which extends through a perforated guide 44 secured to lever 39. The guide 44 also serves as a seat for a compression spring 45 which engages the rear enlarged portion 46 of rod 45 and urges the rod toward the cluster casting 12. Pivotally secured to the end of rod 43 is a link 47 which is secured to the latch arm 48. Latch arm 48 is pivotally secured at 49 to the lever 39 and is provided with a locking notch on its under side adapted to engage lug 50 which is secured to the cluster casting 12.

The drive connections C between the drive-wheel 38 of the motor and the rear wheel A' preferably include a rubber-surfaced clutch wheel 51 equipped with a pulley 52 and a flexible belt 53 connecting the pulley 52 and a pulley 54 secured to the rear wheel A'. As shown more clearly in Fig. 3, the clutch wheel 51 is preferably formed of metal and has its hub portion grooved at 55 to provide the pulley 52. The wheel 51 is mounted on roller bearings carried by the shaft 56 which is secured to the beams 19 of the hanger casting 14. Preferably, the wheel 51 is provided about its periphery with a resilient band 57 of rubber or other suitable material. The belt 53 which connects pulley 52 and pulley 54 is also preferably formed of fabric-reinforced rubber. The pulley 54 may be secured to the rear wheel in any suitable way. In the illustration given, the pulley is connected to the metal rim 58 by means of spaced metal supports 59a. The drawings do not show the seat, handle bars, and switch connections carried by the handle bars for controlling the motor. Such parts are of well known construction and form no part of the present invention.

In the operation of the motor bicycle, the operator starts off riding the bicycle as an ordinary bicycle, holding the lever 39 depressed to prevent engagement of drive wheel 38 with wheel 51. After some momentum has been attained, he gradually releases the handle 39 so as to bring the drive wheel 38 into engagement with the rubber sleeve 57 of wheel 51. The weight of the motor tends to hold the drive wheel 38 against wheel 51. The motor is thus set into operation and after it is functioning, the operator raises handle 39 to bring the latch 48 into engagement with stud 50, thus locking the drive wheel 38 against the rubber covered wheel 51. It will be observed that during the driving operation, the operator has complete control of the starting of the motor and its operation through the manipulation of handle 39. If the motor is started, and he wishes to allow it to gain momentum before subjecting it to the load of driving the bicycle, the can depress handle 39 until the drive wheel 38 to free the drive wheel 38 until the motor is functioning satisfactorily. Then, too, if the motor is difficult to start, and if the engagement of wheel 38 with wheel 51 places too great a burden upon the rider in pedaling, he may disconnect wheel 38 from wheel 51 until the momentum of the bicycle is increased.

While, in the illustrations given, I have shown a specific construction for the frame and a specific location for mounting the motor, it will be understood that changes may be made in such parts and other parts of the apparatus without departing from the spirit of my invention. Substantial changes in the location and shape of detail parts, such as, for example, the gasoline tank, will undoubtedly be made in the exercise of choice by mechanics.

The foregoing detailed description has been given for clearness of understanding only, and no unnecessary limitations should be understood therefrom, but the appended claims should be construed as broadly as permissible, in view of the prior art.

I claim:

1. In a motor bicycle of the character set forth provided with a hanger and axle-equipped wheels, a frame having spaced supporting beams extending between the hanger and the rear axle, a motor equipped with a drive-wheel pivotally carried by the frame, a clutch-wheel carried by said spaced beams adapted to engage said drive wheel when the motor is in lowered position, drive means connecting the clutch-wheel to the rear wheel of the frame, and means for raising and lowering the motor.

2. In a motor bicycle of the character set forth provided with a hanger and axle-equipped wheels, a frame having a support extending between its hanger and the rear axle, a motor, a drive wheel driven by said motor, means for raising and lowering said drive wheel, a clutch-wheel mounted on said support and adapted to engage said drive wheel when the latter is in lowered position, drive means connecting the clutch-wheel to the rear wheel of the frame, and means for raising and lowering said drive wheel.

3. In a motor bicycle of the character set forth, a frame equipped with front and rear wheels, a clutch-wheel having drive connections with the rear wheel, a motor pivotally supported by said frame and equipped with a drive wheel adapted to rest upon said clutch-wheel, means for raising and lowering said motor and said drive wheel, said drive wheel, when engaging said clutch-wheel, being held against said wheel by the combined weight of said motor and said drive wheel.

4. In a motor bicycle of the character set forth, a bicycle frame equipped with a hanger member and with front and rear wheels, a rear wheel support extending between the hanger and the hub of the rear wheel, a wheel rotatably supported in said rear wheel support, drive connections between said second-mentioned wheel and said rear wheel, a motor carried by said frame, a drive wheel driven by said motor, and means for bringing said drive wheel into frictional engagement with said second-mentioned wheel.

5. In a motor bicycle of the character set forth, a wheel-equipped frame, a drive-wheel equipped motor movably carried by the frame and having a weighted wheel and cylinder on opposite sides of said drive wheel, a clutch-wheel rotatably carried by said frame, means for moving said drive-wheel to cause the same to rest upon and in frictional engagement with said clutch-wheel, and drive means connecting the clutch wheel to the rear wheel of the frame.

6. In a motor bicycle of the character set forth, a bicycle frame equipped with a hanger member and with front and rear wheels, a rear wheel support extending between the hanger and the hub of the rear wheel, a wheel rotatably supported in said rear wheel support in horizontal alignment with the hanger and hub of the rear wheel, drive connections between said second-mentioned wheel and said rear wheel, a motor carried by said frame, a drive wheel driven by said motor and means for bringing said drive wheel into engagement with said second-mentioned wheel.

7. In a motor bicycle of the character set forth, a frame equipped with front and rear wheels, a clutch-wheel having drive connections with the rear wheel, a motor pivotally supported by said frame and equipped with a drive wheel adapted to rest upon said clutch wheel, a resilient sleeve covering said clutch wheel, means for raising and lowering said motor and said drive wheel, said drive wheel, when engaging said clutch wheel, being held against said wheel by the combined weight of said motor and said drive wheel.

8. In a motor bicycle of the character set forth, a frame equipped with front and rear wheels, a clutch-wheel member having drive connections with the rear wheel, a motor pivotally supported by said frame and equipped with a drive wheel member adapted to rest upon said clutch wheel member, a resilient sleeve covering at least one of said wheel members, means for raising and lowering said motor and said drive wheel, said drive wheel, when engaging said clutch wheel, being held against said clutch wheel by the combined weight of said motor and drive wheel.

9. In a motor bicycle of the character set forth, a frame equipped with front and rear wheels, a clutch-wheel member having drive connections with the rear wheel, a motor pivotally supported by said frame and equipped with a drive wheel member adapted to rest upon said clutch wheel member, a resilient sleeve covering at least one of said wheel members, means for raising and lowering said motor and said drive wheel, and means for locking said drive wheel member against said clutch wheel member, said resilient sleeve permitting said wheel members to move at relatively different speeds while said wheel members are in locked position.

GEORGE S. LEWIS.